United States Patent [19]

Kashio et al.

[11] Patent Number: 5,739,234
[45] Date of Patent: Apr. 14, 1998

[54] EPOXY GROUP-CONTAINING VINYLIDENE FLUORIDE COPOLYMER AND ITS APPLICATION TO SECONDARY BATTERY

[75] Inventors: Hidetora Kashio; Katsuo Horie; Fujio Suzuki, all of Iwaki, Japan

[73] Assignee: Kureha Kagaku Kogyo Kabushiki Kaisha, Tokyo, Japan

[21] Appl. No.: 646,492

[22] Filed: May 8, 1996

[30] Foreign Application Priority Data

Jun. 29, 1995 [JP] Japan .................................. 7-184961

[51] Int. Cl.$^6$ .................................................. C08F 14/22
[52] U.S. Cl. ...................... 526/255; 524/210; 524/545; 429/217
[58] Field of Search .............................. 525/276, 326.2; 526/255; 524/210, 545

[56] References Cited

U.S. PATENT DOCUMENTS

| | | | |
|---|---|---|---|
| 4,842,918 | 6/1989 | Ochiumi | 428/413 |
| 5,082,911 | 1/1992 | Kappler et al. | 526/255 |
| 5,415,958 | 5/1995 | Takahashi et al. | 429/217 |

FOREIGN PATENT DOCUMENTS

| | | |
|---|---|---|
| 0135917 | 4/1985 | European Pat. Off. . |
| 0396444 | 11/1990 | European Pat. Off. . |
| 54-163985 | 12/1979 | Japan . |
| 63-218715 | 9/1988 | Japan . |
| 63-313508 | 9/1988 | Japan . |
| 3-245880 | 11/1991 | Japan . |
| 4-202485 | 7/1992 | Japan . |

*Primary Examiner*—Robert E. Sellers
*Attorney, Agent, or Firm*—Wenderoth, Lind & Ponack

[57] ABSTRACT

A vinylidene fluoride copolymer having a relatively high molecular weight is formed by copolymerizing (a) vinylidene fluoride as a principal component, (b) a small amount of epoxy group-containing monomer, and (c) an optional component, such as an unsaturated dibasic acid monoester functioning as a curing agent for the epoxy group. When cured with an optional epoxy curing agent, the vinylidene fluoride copolymer provides a cured product having an adhesion with a metal substrate, etc., and also showing excellent solvent resistance and chemical resistance. The vinylidene fluoride copolymer is particularly suitable for constituting a binder for producing an electrode for a non-aqueous solvent-type secondary battery.

5 Claims, 1 Drawing Sheet

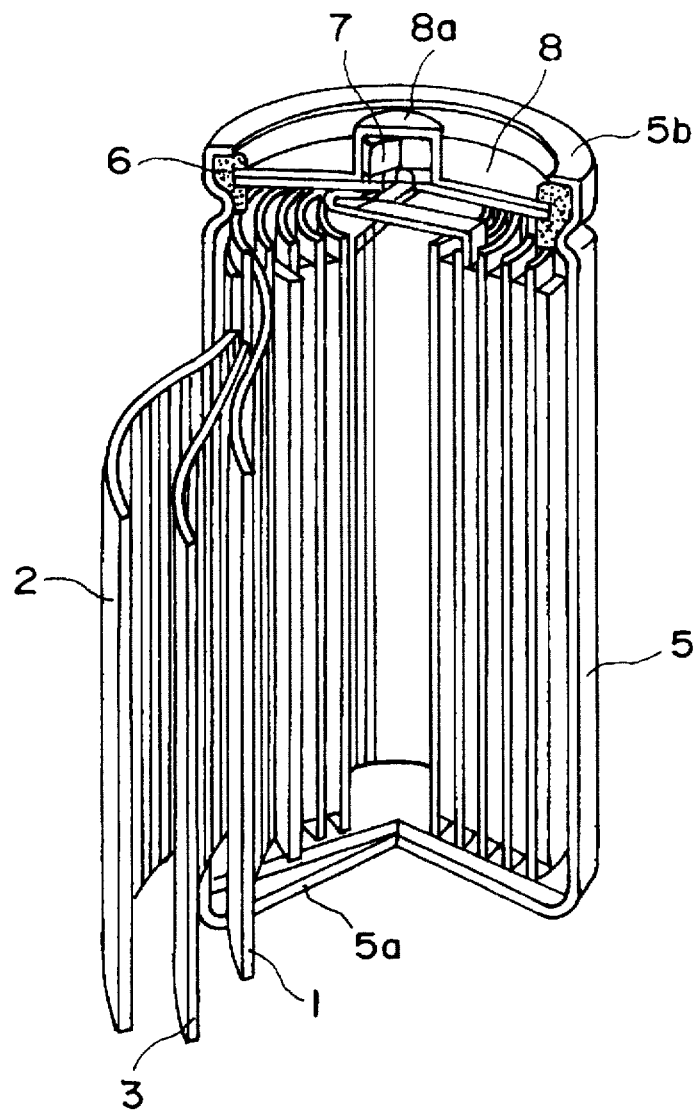
F I G. 1
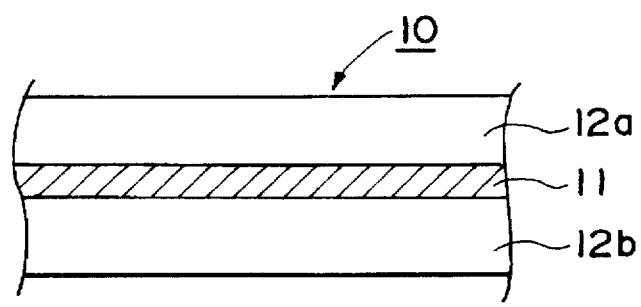
F I G. 2

EPOXY GROUP-CONTAINING VINYLIDENE FLUORIDE COPOLYMER AND ITS APPLICATION TO SECONDARY BATTERY

FIELD OF THE INVENTION AND RELATED ART

The present invention relates to a vinylidene fluoride copolymer and a resin composition containing the copolymer capable of providing a cured product which shows an improved adhesion to a substrate, such as that of a metal, and an excellent chemical resistance. The resin composition is useful in the fields of binders, paints, etc. The present invention also relates to an electrode structure for a non-aqueous solvent-type secondary battery containing such a vinylidene fluoride copolymer as a binder, and further such a secondary battery.

Polyvinylidene fluoride resins are excellent in chemical resistance, weatherability and anti-staining characteristic, and have been used not only as a film-forming or shaping material but also as materials for paint and binder. However, a conventional polyvinylidene fluoride resin has a rather poor adhesion to, e.g., a metal substrate and therefore an improved adhesion strength has been desired.

Japanese Laid-Open Patent Application (JP-A) 3-17109 discloses a curable copolymer having an inherent viscosity in the range of 0.03–0.4 dl/g as measured at a concentration of 1 g/dl in dimethylformamide at 25° C. and comprising substantially polymerized units derived from (a) 50–98 mols of vinylidene fluoride, (b) 2–50 mols of a fluorine-containing monomer selected from tetrafluoroethylene, chlorotrifluoroethylene, hexafluoropropylene, or a mixture of at least two of these three monomers, and (c) 2–20 mols of an epoxidized allyl ether, such as allyl glycidyl ether, per 100 mols in total of the above-mentioned fluorine-containing monomers, obtained through solution polymerization. It is also disclosed that the resultant copolymers are soluble in solvents, such as butyl acetate, isobutyl acetate, and ethyl acetate, and can be crosslinked and cured when heated in mixture with a known curing agent, such as melamine formaldehyde, polyamide, organic acid or anhydride thereof, so that they can be used to form a paint or a varnish for providing a coating well adhering to metal, glass, wood, cement, plastic, etc.

These copolymers are, however, soluble in ordinary solvents as described above and can or be applied to usages requiring chemical resistance or heat resistance without curing. Further, even after curing, they cannot yet be satisfactorily applied to a usage requiring a high degree of chemical resistance, such as a binder for electrode production for non-aqueous solvent-type lithium secondary batteries.

As a result of study for providing a vinylidene fluoride copolymer having an improved adhesion to a substrate, such as a metal substrate, while retaining excellent properties of vinylidene fluoride resins, our research and development group has already obtained a copolymer of vinylidene fluoride with a polar monomer, such as an unsaturated dibasic acid monoester, showing improved adhesion and solvent resistance (U.S. Pat. No. 5,415,958). However, it is still difficult to say that even the thus-obtained vinylidene fluoride copolymer has sufficient solvent resistance and chemical resistance when considered to be used in a severe condition, e.g., as a binder for electrode production for non-aqueous solvent-type secondary batteries.

SUMMARY OF THE INVENTION

A principal object of the present invention is to provide a vinylidene fluoride copolymer capable of providing a binder or a coating film which shows a good adhesion to a substrate, such as a metal substrate, and also further improved solvent resistance and chemical resistance.

Another object of the present invention is to provide a process for producing such a vinylidene fluoride copolymer.

Further objects of the present invention are to provide a resin composition, an electrode structure for a non-aqueous solvent-type secondary battery, and further a secondary battery, containing such a vinylidene fluoride copolymer.

According to our study, it has been discovered that a vinylidene fluoride copolymer comprising a relatively small amount of a specific monomer having an epoxy group and vinylidene fluoride as a principal monomer component and having a moderately large molecular weight (inherent viscosity) provides a product having an excellent chemical resistance when cured with a curing agent capable of causing a crosslinking-curing reaction by reacting with an epoxy group. In this instance, if a vinylidene fluoride copolymer having a functional group, such as a carboxyl group, is used as the curing agent, it is possible to provide a cured product well adhering to a substrate, such as a metal substrate, and also having an excellent chemical resistance.

Further, it has been also found that the above-mentioned properties can be exhibited by a ternary copolymer alone obtained from vinylidene fluoride monomer, a relatively small amount of epoxy group-containing monomer and a third monomer having a functional group, such as a carboxyl group, causing a crosslinking-curing reaction through reaction with the epoxy groups (hereinafter, sometimes called "curing group") or a quaternary copolymer alone obtained by further including a fourth monomer in addition to the above monomers.

According to the present invention, there is provided an epoxy group-containing vinylidene fluoride copolymer, comprising: a copolymer of (a) vinylidene fluoride monomer, and, based on 100 mols of the vinylidene fluoride monomer, (b) 0.2–5.0 mols of an epoxy group-containing vinyl monomer and (c) 0–5.0 mols of a third monomer, said copolymer having a melting point of 150°–175° C. as measured by a differential scanning calorimeter (DSC) and an inherent viscosity of 0.5–2.0 dl/g as measured in solvent N,N-dimethylformamide.

According to the present invention, there is also provided a process for producing a vinylidene fluoride copolymer characterized by producing the above-mentioned vinylidene fluoride copolymer by suspension polymerization in water as the dispersion medium.

According to the present invention, there is also provided a resin composition, which comprises the above-mentioned epoxy group-containing vinylidene fluoride copolymer, an organic solvent dissolving the vinylidene fluoride copolymer and optionally a curing agent reacting with the epoxy group, according to a first embodiment, and comprises an epoxy group-containing vinylidene fluoride copolymer comprising vinylidene fluoride monomer and based on 100 mols of the vinylidene fluoride monomer, 0.2–5.0 mols of an epoxy group-containing vinyl monomer, a carboxyl group-containing vinylidene fluoride copolymer comprising vinylidene fluoride monomer and based on 100 mols of the vinylidene fluoride monomer, 0.2–5.0 mols of an unsaturated dibasic acid monoester, and an organic solvent dissolving the vinylidene fluoride copolymers, according to a second embodiment.

According to still another aspect of the present invention, there is provided an electrode structure for a non-aqueous solvent-type secondary battery, comprising: an electroconductive substrate and a composite electrode layer disposed on at least one surface of the electroconductive substrate; said composite electrode layer comprising a particulate active substance, or a particulate active substance and an electroconductive material, and a binder comprising the above vinylidene fluoride copolymer.

According to the present invention, there is further provided a non-aqueous solvent-type secondary battery, comprising, a positive electrode, a negative electrode, and a separator and a non-aqueous electrolytic solution disposed between the positive and negative electrodes;

at least one of the positive and negative electrodes comprising the above-mentioned electrode structure.

These and other objects, features and advantages of the present invention will become more apparent upon a consideration of the following description of the preferred embodiments of the present invention taken in conjunction with the accompanying drawing.

BRIEF DESCRIPTION OF THE DRAWING

FIG. 1 is a partially exploded perspective view of a non-aqueous solvent-type secondary battery which can be constituted according to the invention.

FIG. 2 is a partial sectional view of an electrode structure adopted in the secondary battery.

DETAILED DESCRIPTION OF THE INVENTION

The epoxy group-containing vinylidene fluoride copolymer according to the present invention has a melting point of 150°–175° C. as described above and preferably 160°–175° C.

The melting point of a vinylidene fluoride copolymer decreases with an increase in content of comonomer (i.e., a monomer copolymerized with vinylidene fluoride monomer) in a region of relatively small Comonomer content as in the vinylidene fluoride copolymer of the present invention. The melting point of the vinylidene fluoride copolymer may be measured by using a DSC (differential scanning calorimeter) as will be described hereinafter.

The inherent viscosity of a vinylidene fluoride copolymer described herein refers to a logarithmic viscosity number at 30° C. of a solution obtained by dissolving 4 g of a sample resin in 1 liter of N,N-dimethylformamide. A vinylidene fluoride copolymer having a higher inherent viscosity shows a better solvent resistance. However, a vinylidene fluoride copolymer having a higher inherent viscosity shows a smaller solubility in a solvent. The epoxy group-containing vinylidene fluoride copolymer according to the present invention may suitably have an inherent viscosity in the range of 0.5–2.0 dl/g, preferably 0.8–1.5 dl/g.

Examples of the epoxy group-containing vinyl monomer (second monomer) used in the present invention to be copolymerized with vinylidene fluoride monomer may include: allyl glycidyl ether ($C_6H_{10}O_2$), methallyl glycidyl ether ($C_7H_{12}O_2$), vinyl glycidyl ether ($C_5H_8O_2$), glycidyl crotonate ($C_7H_{10}O_3$), and glycidyl allyl acetate ($C_8H_{12}O_3$). Among these, allyl glycidyl ether is particularly preferred.

The epoxy group-containing vinyl monomer (second monomer) may suitably be used in an amount of 0.2–5.0 mols per 100 mols of vinylidene fluoride monomer. Below 0.2 mol, the resultant vinylidene fluoride copolymer can only provide a cured product having a low crosslinkage density, thus belong liable to fail in providing an improved chemical resistance, even after the curing with a curing agent. On the other hand, in case of too much epoxy group-containing monomer, the resultant copolymer and cured product are liable to have a lower chemical resistance. It is further preferred that the 0.2–3.0 mols of the epoxy group-containing monomer is copolymerized per 100 mols of vinylidene fluoride monomer.

By copolymerizing a third monomer (copolymerizable with vinylidene fluoride monomer) other than the epoxy group-containing monomer together with vinylidene fluoride monomer and the epoxy group-containing monomer, it is possible to control the curing characteristic and the solubility in a solvent of the resultant copolymer. In this case, if a monomer having a curing group (i.e., reacting with an epoxy group to cause crosslinking and curing) is used as the third monomer for copolymerization, the resultant copolymer can be cured by itself, i.e., without adding another curing agent.

Preferred examples of the monomer having a curing group may include monoesters of unsaturated dibasic acid having 5–8 carbon atoms and retaining a carboxyl group, such as monomethyl maleate, monoethyl maleate, monomethyl citraconate and monoethyl citraconate. Among these, maleic acid esters are particularly suited.

In addition to or in substitution for the monomer having a curing group, it is also possible to copolymerize a fluorine-containing monomer or a hydrocarbon monomer, such as ethylene or propylene, copolymerizable with vinylidene fluoride monomer for controlling the property of the resultant vinylidene fluoride copolymer, such as the solubility in a solvent. Examples of the fluorine-containing monomer copolymerizable with vinylidene fluoride monomer may include: vinyl fluoride, trifluoroethylene, trifluorochloroethylene, tetrafluoroethylene, hexafluoropropylene, and fluoroalkyl vinyl ether.

It is preferred that the total amount of the third monomers (inclusive of the monomer having a curing group, the fluorine-containing monomer and the hydrocarbon monomer) to be copolymerized with vinylidene fluoride monomer other than the epoxy group-containing monomer does not exceed 5.0 mols per 100 mols of vinylidene fluoride monomer. In excess of 5.0 mols, the resultant copolymer is caused to have a lower chemical resistance.

An epoxy group-containing vinylidene fluoride copolymer obtained by copolymerizing vinylidene fluoride monomer, and, based on 100 mols of the vinylidene fluoride monomer, 0.2–5.0 mols of an epoxy group-containing vinyl monomer (particularly preferably, allyl glycidyl ether), and 0.2–5.0 mols (further preferably, an amount of providing 0.3–3.0 mols of carbonyl group per 1 mol of epoxy group) of an unsaturated dibasic acid monoester (particularly preferably, maleic acid monoester) and having a melting point of 150°–175° C. as measured by a DSC and an inherent viscosity of 0.5–2.0 dl/g as measured in solvent N,N-dimethylformamide, can cause crosslinking and curing on heating by itself, i.e., without adding an additional curing agent to provide a cured product showing a good adhesion with a substrate, such as a metal substrate, and a good solvent resistance. Accordingly, the epoxy group-containing vinylidene fluoride copolymer is suitably used in the field of paints or binders.

The above-mentioned epoxy group-containing vinylidene fluoride copolymer according to the present invention may be obtained through suspension polymerization, emulsion polymerization, solution polymerization, etc. In order to allow easy post treatment, however, it is preferred to perform suspension polymerization or emulsion polymerization in an aqueous medium, particularly aqueous suspension polymerization.

In such suspension polymerization using water as a dispersion medium, it is possible to use a suspension aid, such as methyl cellulose, methoxylated methyl cellulose, propoxidized methyl cellulose, hydroxyethyl cellulose, hydroxypropyl cellulose, polyvinyl alcohol, polyethylene oxide or gelatin in a proportion of 0.005–1.0 wt. %, preferably 0.01–0.4 wt. %, based on the water.

It is possible to use a polymerization initiator, such as diisopropyl peroxydicarbonate, dinormalpropyl peroxydicarbonate, dinormalheptafluoropropyl peroxydicarbonate, isobutyryl peroxide, di(chlorofluoroacyl) peroxide, or di(perfluoroacyl) peroxide. Such a polymerization initiator may be used in a proportion of 0.1–5 wt. %, preferably 0.5–2 wt. %, of the total monomer amount.

It is also possible to add a chain transfer agent, such as ethyl acetate, methyl acetate, acetone, ethanol, n-propanol, acetaldehyde, propylaldehyde, ethyl propionate, or carbon tetrachloride, so as to control the polymerization degree of the resultant copolymer. The addition amount thereof may be ordinarily 0.1–5 wt. %, preferably 0.5–3 wt. %, of the total monomer amount.

The monomers may be charged in such an amount as to provide a weight ratio of the total monomer amount to water in the range of 1:1–1:10, preferably 1:2–1:5. The polymerization may be performed at a temperature of 10–50° C. for 10–100 hours.

By suspension polymerization as described above, it is possible to easily produce the vinylidene fluoride copolymer according to the present invention.

The epoxy group-containing vinylidene fluoride copolymer according to the present invention can be dissolved alone in an amount of 10 to 100 wt. parts in 500–2000 wt. parts of an organic solvent to form a solution (a resin composition according to the present invention) suitable for use as a paint, a lining material or a binder solution, but may preferably be further mixed with 0.3–3.0 mols of a curing agent per 1 mol of the epoxy group contained therein to provide a paint, a binder solution, etc.

The curing agent can be a low-molecular weight curing agent ordinarily used in epoxy resins, including: amines, such as diethylenetriamine, triethylenetetramine, ethylenediamine, and tetraethylenepentamine; acid anhydrides, such as phthalic anhydride, succinic anhydride and pyromellitic anhydride; and glycidyl ether amine adducts.

The curing agent may more suitably comprise a vinylidene fluoride copolymer obtained by copolymerizing vinylidene fluoride monomer with an unsaturated dibasic acid monoester (hereinafter sometimes called "carboxyl group-containing vinylidene fluoride copolymer"). In this case, the resultant cured product shows a good adhesion with, e.g., a metal substrate, and also a good solvent resistance.

The carboxyl group-containing vinylidene fluoride copolymer suitably used for this purpose may comprise a copolymer of vinylidene fluoride monomer and, based on 100 mols of the vinylidene fluoride monomer, 0.2–5.0 mols of an unsaturated dibasic acid monoester.

In addition to vinylidene fluoride monomer, it is possible to add up to 25 mol. % thereof of a fluorine-containing monomer or a hydrocarbon monomer such as ethylene or propylene copolymerizable with vinylidene fluoride. Examples of the fluorine-containing monomers copolymerizable with vinylidene fluoride may include: vinyl fluoride, trifluoroethylene, trifluorochloroethylene, tetrafluoroethylene, hexafluoropropylene, and fluoroalkyl vinyl ethers. Such another monomer copolymerizable with vinylidene fluoride may preferably be used in a proportion not exceeding 20 wt. % of the total of vinylidene fluoride and such another monomer in view of a balance between solubility in a solvent of the resultant copolymer to obtain a resin composition and solvent resistance of the cured product obtained by heating the resin composition.

The above-mentioned monomer principally comprising vinylidene fluoride may be copolymerized with an unsaturated dibasic acid ester which may preferably have 5–8 carbon atoms. Examples of such unsaturated dibasic acid monoesters may include: maleic acid monomethyl ester, maleic acid monoethyl ester, citraconic acid monomethyl ester, and citraconic acid monoethyl ester. It is particularly preferred to use maleic acid monomethyl ester or citraconic acid monomethyl ester.

The copolymerization may be performed by suspension polymerization, emulsion polymerization, solution polymerization, etc. In order to allow easy post treatment, however, it is preferred to perform suspension polymerization or emulsion polymerization in an aqueous medium, particularly aqueous suspension polymerization.

A preferred form of the resin composition according to the present invention may be obtained by dissolving the above-mentioned epoxy group-containing vinylidene fluoride copolymer and the above-mentioned carboxyl group-containing vinylidene fluoride copolymer (preferably in an amount sufficient to provide 0.3–3.0 mols of carbonyl group per 1 mol of epoxy group) in an organic solvent.

Suitable examples of the solvent may include: N-methyl-2-pyrrolidone, N,N-dimethylformamide, N,N-dimethylacetamide, and dimethylsulfoxide.

Further, the above-mentioned self-curable vinylidene fluoride copolymer having both an epoxy group and a carboxyl group and obtained by copolymerizing vinylidene fluoride monomer, and, based on 100 mols of the vinylidene fluoride monomer, 0.2–5.0 mols of an epoxy group-containing vinyl monomer and 0.2–5.0 mols of an unsaturated dibasic acid monoester, may be dissolved in an organic solvent as described above to provide another preferred form of the resin composition according to the present invention without adding another curing agent.

The above-mentioned carboxyl group-containing vinylidene fluoride copolymer may preferably contain $1 \times 10^{-5}$–$5 \times 10^{-4}$ mol/g of carboxyl groups.

Further, both of the above-mentioned epoxy group-containing vinylidene fluoride copolymer (including the self-curable one) and the carboxyl group-containing vinylidene fluoride copolymer may preferably have a melting point of 160°–175° C. as measured by a DSC and an inherent viscosity as measured in solvent N,N-dimethylformamide of 0.5–1.5 dl/g, particularly 0.8–1.5 dl/g, so as to provide a cured product having a high chemical resistance.

The amount of the organic solvent in the resin composition may be determined in consideration of applicability to a substrate, film-formability on drying, etc. It is ordinarily preferred that the resin component (total of the epoxy group-containing vinylidene fluoride copolymer and carboxyl group-containing vinylidene fluoride copolymer) and the organic solvent may be used in a weight ratio of 2:98 to 20:80.

The epoxy group-containing vinylidene fluoride copolymer and the carboxyl group-containing vinylidene fluoride copolymer may respectively be supplied for use in a small particle size, i.e., an average particle size of at most 1000 μm, particularly 50–350 μm, so as to allow fast dissolution in the above solvent.

The thus-obtained resin composition according to the present invention may be cured by evaporation of the solvent and heating to an appropriately elevated temperature of, e.g., 40°–160° C., to provide a solvent-resistant and chemical-resistant, cured product. Thus, the resin composition according to the present invention may suitably be used as a binder, a paint, a lining material, etc., requiring an adhesion to a substrate, such as that of a metal, and also a solvent resistance and a chemical resistance. Particularly, the resin composition according to the present invention exhibits an excellent performance as a binder for producing electrodes for a non-aqueous solvent-type secondary battery, requiring the above properties in extreme degrees. Accordingly, this usage will be described in further detail.

FIG. 1 is a partially exploded perspective view of a lithium secondary battery as an embodiment of a non-aqueous solvent-type secondary battery according to the present invention.

More specifically, the secondary battery basically includes a laminate structure including a positive electrode 1, a negative electrode 2 and a separator 3 disposed between the positive and negative electrodes 1 and 2 and comprising a fine porous film of a polymeric material, such as polyethylene or polypropylene, impregnated with an electrolytic solution. The laminate structure is wound in a vortex shape to form an electricity-generating element which is housed within a metal casing 5 having a bottom constituting a negative electrode terminal 5a. In the secondary battery, the negative electrode 2 is electrically connected to the negative electrode terminal 5a, and the uppermost portion of the battery is constituted by disposing a gasket 6 and a safety valve 7 covered with a top plate 8 having a projection constituting a positive electrode terminal 8a electrically connected to the positive electrode. Further, the uppermost rim 5b of the casing 5 is crimped toward the inner side to form an entirely sealed cell structure enclosing the electricity-generating element.

Herein, the positive electrode 1 or negative electrode 2 may be constituted by art electrode structure 10 having a sectional structure as partially shown in FIG. 2. More specifically, the electrode structure 10 includes an electroconductive substrate 11 comprising a foil or wire net of a metal, such as copper, iron, stainless steel, steel, aluminum, nickel or titanium and having a thickness of, e.g... 5–100 μm, or 5–20 μm for a small-sized battery, and a composite electrode layer (12a, 12b) of, e.g., 10–1000 μm in thickness for a small-sized battery, on at least one surface, preferably on both surfaces as shown in FIG. 2, of the electroconductive substrate.

The composite electrode layers 12a and 12b are respectively a layer formed by applying an electrode-forming composition comprising a particulate or fibrous active substance, the resin composition according to the present invention as a binder and optionally, an electroconductive material such as electroconductive carbon, followed by drying and curing at an elevated temperature.

The active substance for constituting a positive electrode may preferably comprise a complex metal chalcogenide represented by a general formula: $LiMY_2$ (wherein M denotes at least one species of transition metals such as Co and Ni, and Y denotes a chalcogen such as O or S), particularly a complex metal oxide inclusive of $LiCoO_2$ as a representative. For constituting a negative electrode, the active substance may preferably comprise a carbonaceous substance, such as graphite, activated carbon, or a carbonized product formed by calcination of phenolic resin or pitch.

The electroconductive material may optionally be added for the purpose of increasing the electroconductivity of the composite electrode layer in case of using an active substance, such as $LiCoO_2$ showing a small electron conductivity. Examples thereof may include fine powders or fibers of carbonaceous substances such as carbon black and graphite, and metals such as nickel and aluminum. These electroconductive materials need not be included, e.g., when a carbonaceous substance showing a sufficient electroconductivity is used as the active substance.

As the binder does not contribute at all to the charge-discharge capacity of the battery so that the addition amount thereof should be reduced to the minimum. Accordingly, the binder is required to show a function of well holding the powder materials inclusive of the active substance and show an excellent adhesion to the electroconductive substrate even in a small amount thereof. The binder is generally electrically insulating so that the use thereof in an increased amount results in a larger internal resistance of the battery. Also from this viewpoint, the binder is required to exhibit its performances in as small an amount as possible.

Generally, the binder is used in a very small amount and more specifically at most 30 wt. % of the total composite electrode layer. In such a small amount, the binder cannot completely fill the voids between particles in the composite electrode layer or voids between the electroconductive substrate and the particles. On the other hand, in the case of a paint or a lining material containing fillers such as a pigment, the binder is used in an amount sufficient to fill the voids between the filler particles, so that there occurs little problem regarding the filler-holding performance of the binder. In the case of the electrode-forming binder, however, the binder is used in such a very small amount as described above and is required to show a performance of well holding the particulate active substance and an excellent adhesion to the electroconductive substrate.

The non-aqueous electrolytic solution impregnating the separator 3 may generally comprise a solution of an electrolyte, such as $LiClO_4$, $LiPF_6$ or $LiBF_4$ in a solvent, such as ethylene carbonate, propylene carbonate, dimethoxymethane, tetrahydrofuran or γ-butyrolactone, which generally shows a strong dissolving power for a polymer. The binder is therefore required to be free from substantial lowering in its binder performance even dipped in such a solvent for a long period.

The resin composition according to the present invention may preferably be used in the following manner in case of producing a thin electrode structure 10 for a battery.

The epoxy group-containing vinylidene fluoride copolymer and optionally a curing agent or a carboxyl group-containing vinylidene fluoride copolymer are dissolved in an organic solvent to form a resin composition according to the present invention as described above.

Then, an active substance and optionally an electroconductive material, as described above, are added into and mixed with the resin composition to prepare an electrode-forming composition in a slurry form, which is then uniformly applied onto a metal foil or wire net of, e.g., ca. 5–20 μm in thickness, followed by drying and hot pressing at e.g., 40°–160° C. to form a thin composite electrode layer (12a, 12b) of, e.g., around 100 μm in thickness, on the electroconductive substrate 11. During the hot pressing, the solvent is evaporated off and the resin is cured by crosslinking to ensure an intimate adhesion with the electroconductive substrate and the particulate or fibrous filler.

The weight ratio of the particulate or fibrous component (active substance and optional electroconductive material) to the vinylidene fluoride copolymer may be generally ca. 80:20–98:2 and more specifically determined in consideration of the required performances of holding the particulate component, adhesion to the electroconductive substrate and electroconductivity of the electrode.

In the composite electrode layer formed on the electroconductive substrate according to the above-mentioned weight ratio, the vinylidene fluoride copolymer cannot completely fill the voids between the particulate components. However, if a solvent well dissolving the vinylidene fluoride copolymer is used, the copolymer can be uniformly dispersed and form a network structure within the composite electrode layer after drying and curing, thus satisfactorily holding the particulate or fibrous components.

As described above, according to the present invention, it is possible to provide a resin composition having an enhanced adhesion to a substrate, such as a metal substrate, and also an improved chemical resistance, and also an epoxy group-containing vinylidene fluoride copolymer curable by crosslinking and useful as a constituent of the resin composition.

Further, by forming a cured product by using the resin composition as a binder, it is possible to obtain an electrode structure for a non-aqueous solvent-type secondary battery and also such as secondary battery.

Hereinbelow, the present invention will be described more specifically based on Examples and Comparative Examples.

The melting point and inherent viscosity of a resultant polymer were measured according to the following methods.

[Melting Point]

A DSC (differential scanning colorimeter) ("TA10A", available from Mettler Instrument A.G.) may be used, and a resin powder sample is heated in a nitrogen atmosphere at a temperature-raising rate of 10° C./min to obtain a DSC curve, on which a temperature giving a maximum heat absorption corresponding to crystalline resin melting is taken as a melting point of the resin sample.

[Inherent Viscosity]

80 mg of a powdery resin sample is dissolved in 20 ml of N,N-dimethylformamide, and the viscosity of the solution is measured within a thermostat vessel at 30° C. by using an Ubbelohde viscometer.

EXAMPLE 1

Into a 2 liter-autoclave, 1000 g of deionized water, 1.2 g of methylcellulose, 5 g of di-n-propyl peroxydicarbonate (NPP), 397 g of vinylidene fluoride, and 3 g of allyl glycidyl ether (giving a vinylidene fluoride/allyl glycidyl ether (mol ratio)=100/0.42), were charged and subjected to suspension polymerization at 25° C. for 70 hours.

After the polymerization, the polymerizate slurry was de-watered, washed with water, dewatered and then dried at 80° C. for 20 hours to obtain a powdery polymer. The polymerization yield, and the melting point and inherent viscosity of the polymer are shown in Table 1 appearing hereinafter.

EXAMPLE 2

Into a 2 liter-autoclave, 1000 g of deionized water, 1.2 g of methylcellulose, 6 g of di-n-propyl peroxydicarbonate (NPP), 291 g of vinylidene fluoride, and 9 g of allyl glycidyl ether (giving a vinylidene fluoride/allyl glycidyl ether (mol ratio)=100/1.74), were charged and subjected to suspension polymerization at 40° C. for 60 hours.

After the polymerization, the polymerizate slurry was treated in the same manner as in Example 1 to obtain a powdery polymer. The polymerization yield, and the melting point and inherent viscosity of the polymer are shown in Table 1 appearing hereinafter.

EXAMPLE 3

Into a 2 liter-autoclave, 1000 g of deionized water, 1.2 g of methylcellulose, 4 g of di-n-propyl peroxydicarbonate (NPP), 396 g of vinylidene fluoride, 2 g of allyl glycidyl ether and 2 g of monomethyl maleate (giving vinylidene fluoride/allyl glycidyl ether/monomethyl maleate (mol ratio) =100/0.28/0.25), were charged and subjected to suspension polymerization at 25° C. for 55 hours.

After the polymerization, the polymerizate slurry was treated in the same manner as in Example 1 to obtain a powdery polymer. The polymerization yield, and the melting point and inherent viscosity of the polymer are shown in Table 1 appearing hereinafter.

EXAMPLE 4

Into a 2 liter-autoclave, 1000 g of deionized water, 1.2 g of methylcellulose, 4 g of di-n-propyl peroxydicarbonate (NPP), 384 g of vinylidene fluoride, 4 g of allyl glycidyl ether and 12 g of hexafluoropropylene (giving vinylidene fluoride/allyl glycidyl ether/hexafluoropropylene (mol ratio) =100/0.58/1.30), were charged and subjected to suspension polymerization at 25° C. for 80 hours.

After the polymerization, the polymerizate slurry was treated in the same manner as in Example 1 to obtain a powdery polymer. The polymerization yield, and the melting point and inherent viscosity of the polymer are shown in Table 1 appearing hereinafter.

EXAMPLE 5

Into a 2 liter-autoclave, 1000 g of deionized water, 1.2 g of methylcellulose, 4 g of di-n-propyl peroxydicarbonate (NPP), 391 g of vinylidene fluoride, and 9 g of vinyl glycidyl ether (giving a vinylidene fluoride/vinyl glycidyl ether (mol ratio)=100/1.50), were charged and subjected to suspension polymerization at 25° C. for 55 hours.

After the polymerization, the polymerizate slurry was treated in the same manner as in Example 1 to obtain a powdery polymer. The polymerization yield, and the melting point and inherent viscosity of the polymer are shown in Table 1 appearing hereinafter.

REFERENCE EXAMPLE 1

(VDF Homopolymer)

Into a 2 liter-autoclave, 1040 g of deionized water, 0.4 g of methylcellulose, 8 g of ethyl acetate, 2 g of di-n-propyl peroxydicarbonate (NPP) and 400 g of vinylidene fluoride, were charged and subjected to suspension polymerization at 25° C. for 22 hours.

After the polymerization, the polymerizate slurry was treated in the same manner as in Example 1 to obtain a powdery polymer. The polymerization yield, and the melting point and inherent viscosity of the polymer are shown in Table 1 appearing hereinafter.

REFERENCE EXAMPLE 2

(Carboxyl Group-containing Vinylidene Fluoride Copolymer)

Into a 2 liter-autoclave, 1000 g of deionized water, 0.8 g of methylcellulose, 2.5 g of ethyl acetate, 4 g of di-isopropyl peroxydicarbonate (IPP), 396 g of vinylidene fluoride, and 4 g of monomethyl maleate (giving a vinylidene fluoride/monomethyl maleate (mol ratio)=100/ 0.50), were charged and subjected to suspension polymerization at 28° C. for 47 hours.

After the polymerization, the polymerizate slurry was treated in the same manner as in Example 1 to obtain a powdery polymer. The polymerization yield, and the melting point and inherent viscosity of the polymer are shown in Table 1 appearing hereinafter.

[Performance Evaluation of Resin Composition]

The vinylidene fluoride-based resins prepared in the above Examples and Reference Examples were dissolved singly or in combination in N-methyl-2-pyrrolidone (hereinafter sometimes abbreviated as "NMP") to form resin compositions. Each resin composition was formulated to contain the vinylidene fluoride-based resin(s) in total and NMP in a weight ratio of 10:90.

<Peeling Strength>

Each resin composition prepared above was applied onto a 10 μm-thick copper foil (size=100 mm×200 mm), followed by drying at 130° C. and heating for 10 min. at 160° C. to form a 50 μm-thick vinylidene fluoride-based resin film on the copper foil.

Each laminate comprising a copper foil and a vinylidene fluoride-based resin film thus obtained was dipped in propylene carbonate at 60° C. for 7 days. The adhesion strengths between the vinylidene fluoride-based resin film and the copper foil before and after the dipping were respectively measured by a 180 deg.-peeling test.

The above described test is called a peeling strength test.

<Solvent Resistance of Electrodes>

100 wt. parts of each resin composition prepared above (containing 10 wt. parts of solid) was blended with 90 wt. parts of a powdery carbonaceous material having an average particle size of 25 μm prepared by oxidizing petroleum pitch and then calcining the pitch at 1200° C. in a nitrogen atmosphere, to prepare an electrode-forming composition. The composition was uniformly applied onto a 10 μm-thick copper foil (size=100 mm×200 mm) so as to provide a dry film thickness of ca. 100 μm, followed by drying at 130° C. for 10 min to prepare an electrode.

The electrode was dipped in propylene carbonate at 100° C. to measure a time in which the composite electrode layer comprising the powdery carbonaceous material was peeled off the copper foil.

The above-described test is called an electrode solvent resistance test.

EXAMPLE 6

A resin composition was prepared by dissolving 5 wt. parts of the epoxy group-containing vinylidene fluoride copolymer prepared in Example 1 and 5 wt. parts of the copolymer of vinylidene fluoride and monomethyl maleate prepared in Reference Example 2 in 90 wt. parts of N-methyl-2-pyrrolidone (NMP) to prepare a resin composition.

The resin composition was subjected to the peeling strength test and the electrode solvent resistance test, and the results thereof are shown in Table 2 appearing hereinafter.

EXAMPLE 7

A resin composition was prepared by dissolving 5 wt. parts of the epoxy group-containing vinylidene fluoride copolymer prepared in Example 2 and 5 wt. parts of the copolymer of vinylidene fluoride and monomethyl maleate prepared in Reference Example 2 in 90 wt. parts of NMP to prepare a resin composition.

The resin composition was subjected to the peeling strength test and the electrode solvent resistance test, and the results thereof are shown in Table 2.

EXAMPLE 8

A resin composition was prepared by dissolving 10 wt. parts of the vinylidene fluoride copolymer containing both epoxy group and carboxyl group prepared in Example 3 in 90 wt. parts of NMP to prepare a resin composition.

The resin composition was subjected to the peeling strength test and the electrode solvent resistance test, and the results thereof are shown in Table 2.

EXAMPLE 9

A resin composition was prepared by dissolving 5 wt. parts of the epoxy group-containing vinylidene fluoride copolymer prepared in Example 4 and 5 wt. parts of the copolymer of vinylidene fluoride and monomethyl maleate prepared in Reference Example 2 in 90 wt. parts of NMP to prepare a resin composition.

The resin composition was subjected to the peeling strength test and the electrode solvent resistance test, and the results thereof are shown in Table 2.

EXAMPLE 10

A resin composition was prepared by dissolving 5 wt. parts of the epoxy group-containing vinylidene fluoride copolymer prepared in Example 5 and 5 wt. parts of the copolymer of vinylidene fluoride end monomethyl maleate prepared in Reference Example 2 in 90 wt. parts of NMP to prepare a resin composition.

The resin composition was subjected to the peeling strength test and the electrode solvent resistance test, and the results thereof are shown in Table 2.

COMPARATIVE EXAMPLE 1

A resin composition was prepared by dissolving 10 wt. parts of the vinylidene fluoride homopolymer prepared in Reference Example 1 in 90 wt. parts of NMP to prepare a resin composition.

The resin composition was subjected to the peeling strength test and the electrode solvent resistance test, and the results thereof are shown in Table 2.

COMPARATIVE EXAMPLE 2

A resin composition was prepared by dissolving 5 wt. parts of the vinylidene fluoride homopolymer prepared in Reference Example 1 and 5 wt. parts of the copolymer of vinylidene fluoride and monomethyl maleate prepared in Reference Example 2 in 90 wt. parts of NMP to prepare a resin composition.

The resin composition was subjected to the peeling strength test and the electrode solvent resistance test, and the results are shown in Table 2.

TABLE 1

|  | Comonomer*¹ (charge ratio*²) | Polymerization yield (wt. %) | Melting point (°C.) | Inherent viscosity (dl/g) |
|---|---|---|---|---|
| Example 1 | AGE (0.42) | 80 | 172 | 1.20 |
| 2 | AGE (1.74) | 55 | 160 | 0.80 |
| 3 | AGE (0.28) MMM (0.25) | 80 | 168 | 1.30 |
| 4 | AGE (0.58) HFP (1.30) | 75 | 160 | 1.00 |
| 5 Reference | VGE (1.50) | 85 | 165 | 1.10 |
| Example 1 | — | 85 | 176 | 1.10 |
| 2 | MMM (0.50) | 86 | 170 | 1.20 |

*¹: The abbreviations for the comonomers respectively represent the following:
AGE: allyl glycidyl ether
MMM: monomethyl maleate
HFP: hexafluoropropylene
VGE: vinyl glycidyl ether
*²: The numbers for charge ratio in parentheses each represent a number of moles of the comonomer per 100 mols of vinylidene fluoride.

TABLE 2

|  | Peeling strength (g/mm) | | Electrode solvent |
|---|---|---|---|
|  | Before dipping | After dipping | resistance (min.) |
| Example 6 | 21 | 17 | 150 |
| 7 | 18 | 16 | 140 |
| 8 | 17 | 16 | 150 |
| 9 | 20 | 18 | 130 |
| 10 | 19 | 15 | 140 |
| Comparative |  |  |  |
| Example 1 | 5 | 0 | 40 |
| 2 | 20 | 8 | 80 |

What is claimed is:

1. An epoxy group-containing vinylidene fluoride copolymer; comprising: a copolymer of (a) vinylidene fluoride monomer, and, based on 100 mols of the vinylidene fluoride monomer, (b) 0.2–5.0 mols of an epoxy group-containing vinyl monomer and (c) 0.2–5.0 mols of an unsaturated dibasic acid monoester, said copolymer having a melting point of 150°–175° C. as measured by a differential scanning calorimeter (DSC) and an inherent viscosity of 0.5–2.0 dl/g as measured in solvent N,N-dimethylformamide, said vinylidene fluoride copolymer having been produced by suspension polymerization in water as dispersion medium.

2. A vinylidene fluoride copolymer according to claim 1, wherein said epoxy group-containing vinyl monomer comprises allyl glycidyl ether.

3. A vinylidene fluoride copolymer according to claim 1, wherein said epoxy group-containing vinyl monomer comprises allyl glycidyl ether, and said unsaturated dibasic acid monoester comprises maleic acid monoester.

4. A process for producing an epoxy group-containing vinylidene fluoride copolymer, comprising: copolymerizing vinylidene fluoride monomer, and based on 100 mols of the vinylidene fluoride monomer 0.2–5.0 mols of an epoxy group-containing vinyl monomer and by suspension polymerization in water as dispersion medium, to produce a copolymer having a melting point of 150°–175° C. as measured by a differential scanning calorimeter (DSC) and an inherent viscosity of 0.5–2.0 dl/g as measured in solvent N,N-dimethylformamide.

5. A resin composition, comprising: a vinylidene fluoride copolymer according to any one of claims 1, 2 or 3, and an organic solvent dissolving the vinylidene fluoride copolymer.

* * * * *